(12) United States Patent  (10) Patent No.: US 7,707,486 B2
Genesereth et al.  (45) Date of Patent: Apr. 27, 2010

(54) LOGICAL SPREADSHEETS

(75) Inventors: Michael R. Genesereth, Palo Alto, CA (US); Michael Kassoff, Mountain View, CA (US); Nathaniel C. Love, San Francisco, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 829 days.

(21) Appl. No.: 11/197,123

(22) Filed: Aug. 4, 2005

(65) Prior Publication Data

US 2006/0048044 A1  Mar. 2, 2006

Related U.S. Application Data

(60) Provisional application No. 60/599,644, filed on Aug. 6, 2004.

(51) Int. Cl.
*G06N 3/00* (2006.01)
(52) U.S. Cl. ...................................................... 715/212
(58) Field of Classification Search ................ 715/212, 715/213, 214, 215, 216, 217, 218, 219, 220
See application file for complete search history.

(56) References Cited

U.S. PATENT DOCUMENTS

| 5,418,902 | A | 5/1995 | West et al. | 395/148 |
| 6,185,582 | B1 | 2/2001 | Zellweger et al. | 707/503 |
| 6,292,810 | B1 | 9/2001 | Richards | 707/503 |
| 2002/0055954 | A1* | 5/2002 | Breuer | 707/507 |
| 2005/0226505 | A1* | 10/2005 | Wilson | 382/180 |

OTHER PUBLICATIONS

Bibliographic data for Felfernig et al.*
A. Felfernig et al., "Developing constraint-based applications with spreadsheets," Computer Science and Manufacturing, Universitat Klagenfurt, A-020 Klagenfurt, Austria.
Gopal Gupta et al., "Knowledgesheet: A Graphical Spreadsheet Interface for Interactively Developing a Class of Constraint Programs," Laboratory for Logic, Databases, and Advanced Programming, Department of Computer Science, New Mexico State University, Las Cruces, NM.
Michael Spenke et al., "A Spreadsheet Interface for Logic Programming," Chi '89 Proceedings, May 1989, German National Research Center for Computer Science, pp. 75-80.
Marc Stadelmann, "A Spreadsheet Based on Constraints," UIST'93, University of Victoria, Department of Computer Science, Nov. 3-5, 1993.

* cited by examiner

*Primary Examiner*—Kyle R Stork
(74) *Attorney, Agent, or Firm*—Lumen Patent Firm

(57) ABSTRACT

A computerized spreadsheet system includes a set of cells and a separate set of logical constraints on the values of cells. The constraints may be many-to-many relationships that permit omni-directional propagation of values between cells. The constraints may be expressed in a language encompassing first-order logic. Cells are dynamically reclassified as base cells or computed cells as a user specifies values for cells. Non-explosive consequences of the base cell values are computed and displayed in computed cells, even when the values in the base cells are inconsistent with the constraints. The spreadsheet system may also include an auto-complete feature that automatically fills in empty cells with values consistent with the logical constraints and an auto-deconflict feature that automatically changes values in cells to reduce conflicts with the logical constraints.

17 Claims, 4 Drawing Sheets

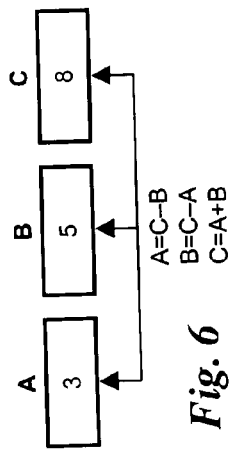
*Fig. 6*
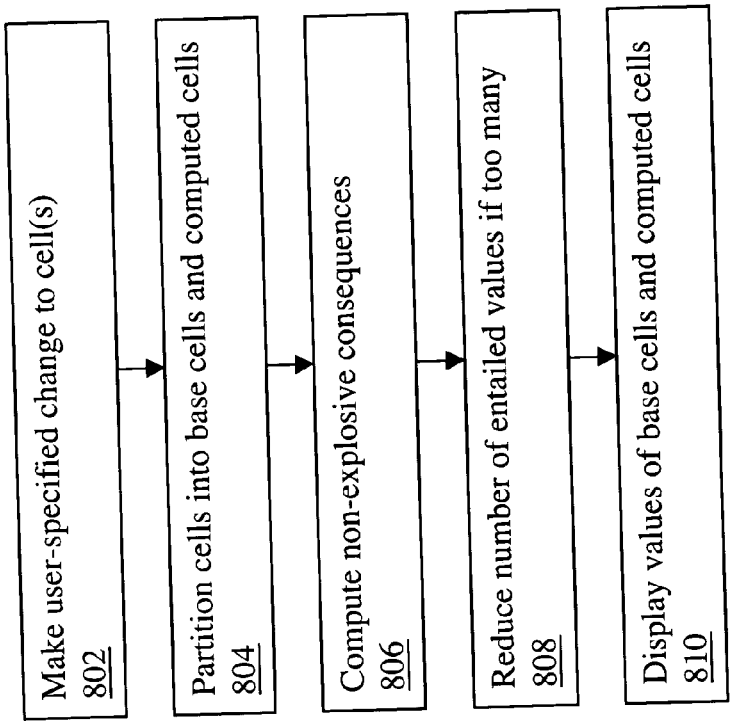
Make user-specified change to cell(s)
802
Partition cells into base cells and computed cells
804
Compute non-explosive consequences
806
Reduce number of entailed values if too many
808
Display values of base cells and computed cells
810
*Fig. 8*
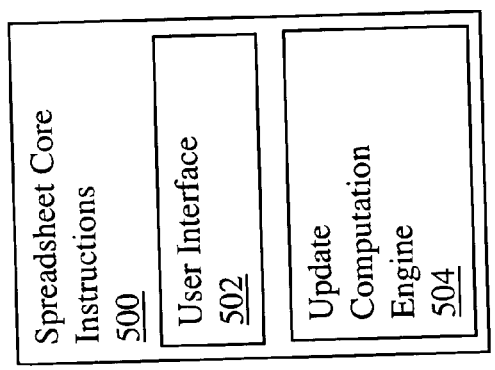
*Fig. 5*
*Fig. 7A*
*Fig. 7B*

*Fig. 9A*

| event | owner | projection | room | time |
|---|---|---|---|---|
| e1 | amy | no | | |
| e2 | bob | no | | |
| e3 | cal | yes | g100 | |

*Fig. 9B*

| schedule | g100 | g200 | g300 |
|---|---|---|---|
| morning | | | |
| afternoon | | | |
| evening | | | |

*Fig. 9C*

| room | projector |
|---|---|
| g100 | yes |
| g200 | no |
| g300 | no |

*Fig. 9D*

| person | faculty |
|---|---|
| amy | yes |
| bob | no |
| cal | yes |

*Fig. 10A*

| event | owner | projection | room | time |
|---|---|---|---|---|
| e1 | amy | no | g100 | morning |
| e2 | bob | no | g200 | afternoon |
| e3 | cal | yes | g100 | |

*Fig. 10B*

| schedule | g100 | g200 | g300 |
|---|---|---|---|
| morning | e1 | | |
| afternoon | | e2 | |
| evening | | | |

*Fig. 10C*

| room | projector |
|---|---|
| g100 | yes |
| g200 | no |
| g300 | no |

*Fig. 10D*

| person | faculty |
|---|---|
| amy | yes |
| bob | no |
| cal | yes |

Fig. 11A

| event | owner | projection | room | time |
|---|---|---|---|---|
| e1 | amy | no | g100 | evening |
| e2 | bob | no | g200 | afternoon |
| e3 | cal | yes | g200 | |

Fig. 11B

| schedule | g100 | g200 | g300 |
|---|---|---|---|
| morning | | | |
| afternoon | | e2 | |
| evening | e1 | | |

Fig. 11C

| room | projector |
|---|---|
| g100 | yes |
| g200 | no |
| g300 | no |

Fig. 11D

| person | faculty |
|---|---|
| amy | yes |
| bob | no |
| cal | yes |

Fig. 12A

| event | owner | projection | room | time |
|---|---|---|---|---|
| e1 | amy | no | g100 | evening |
| e2 | bob | no | g200 | afternoon |
| e3 | cal | yes | g200 | morning |

Fig. 12B

| schedule | g100 | g200 | g300 |
|---|---|---|---|
| morning | | e3 | |
| afternoon | | e2 | |
| evening | e1 | | |

Fig. 12C

| room | projector |
|---|---|
| g100 | yes |
| g200 | no |
| g300 | no |

Fig. 12D

| person | faculty |
|---|---|
| amy | yes |
| bob | no |
| cal | yes |

LOGICAL SPREADSHEETS

CROSS-REFERENCE TO RELATED APPLICATIONS

This application claims priority from U.S. provisional patent application No. 60/599,644 filed Aug. 6, 2004, which is incorporated herein by reference.

FIELD OF THE INVENTION

The present invention relates generally to computer-implemented methods and systems involving spreadsheets, specifically spreadsheets that use relational logic and handle inconsistencies.

BACKGROUND OF THE INVENTION

Traditional computerized spreadsheet systems have enjoyed great success, due primarily to their ability to automatically evaluate multiple mathematical formulas and display updated calculated values whenever user-entered data changes. Traditional spreadsheets employ a user interface for entering data and formulas into cells, combined with an underlying computation engine to support and perform operations on the data according to the formulas. A non-empty cell either contains a specific value entered by the user, or contains a computed value calculated using the formula in the cell. A formula in a cell is a single-valued function of other cells that assigns a unique value to the cell. The restriction to single-valued functions prevents ambiguities in calculated values. Circular references between formulas are not allowed, thus preventing inconsistencies from occurring. Thus, the propagation of values within the spreadsheet is one-way from cells containing specific user-entered data to computed cells containing formulas. For example, in the three-cell spreadsheet of FIG. 1, cells labeled A and B contain user-entered data, while cell C contains the formula C=A+B. The value of cell C is updated automatically based on the values of cells A and B. The user is not permitted to directly change the calculated value for cell C, nor is the spreadsheet permitted to change values in cells A and B. The propagation is thus one-way from cells A and B to cell C, and the distinction between calculated cells and cells containing user-entered values is explicitly determined by the placement of the formula in cell C. One can also observe that the formula C=A+B is a single-valued function which generates a unique value for C given values for A and B. Although these properties of traditional spreadsheets provide simplicity and enforce consistency, they do so at the cost of flexibility.

Another limitation of traditional spreadsheets is that the formulas are typically restricted to algebraic operators (e.g., $+, -, \times, \div, \sqrt{}, \Sigma$) and logical connectives (e.g., $\land, \lor, \neg$). While these have sufficient expressive power for many applications, they are not powerful enough to express the formulas desired for other applications.

In view of the widespread use of spreadsheets for many applications, it would be an improvement in the art to overcome these limitations and other limitations.

SUMMARY OF THE INVENTION

The present invention provides a powerful computerized spreadsheet system with numerous advantages over existing systems. The many-to-one functions of traditional spreadsheets are generalized to many-to-many constraints. In contrast to traditional spreadsheets in which cells must have one value or one formula defining the cell value, cells in the present spreadsheet system can contain multiple values and be associated with multiple constraints. In addition, the constraints are separated from the cells. Because inconsistencies are not controlled by the restriction to unidirectional functions, the spreadsheet system provides an innovative technique for calculating non-explosive consequences for cells even in cases where the data is inconsistent with the constraints.

In contrast with traditional spreadsheets, the distinction between base cells and computed cells is not fixed but dynamic, and the restriction to unidirectional propagation that is found in traditional spreadsheets is relaxed to allow omni-directional propagation. In addition, the formula language is not limited to functions formed from logical connectives and/or algebraic operators, but can include general first-order logical relationships (e.g., allowing quantifiers $\forall$ and $\exists$). Moreover, the spreadsheet cells are structured, allowing rows and columns to be quantified over, providing the ability for the spreadsheet to be queried like a relational database.

In one aspect, the invention provides a computer-implemented method for displaying consequences in an electronic spreadsheet. A set of cells of the spreadsheet and a set of logical constraints on possible values of the cells is specified. At various times during interactive operation with a user, the set of cells may be dynamically partitioned into base cells and computed cells. A set of user-specified values is assigned to the base cells. Significantly, the user is allowed to specify values that may be inconsistent with the specified logical constraints. Non-explosive logical consequences of the user-specified values and the set of logical constraints are automatically computed to produce a complete set of entailed values for the set of computed cells. Some computed cells may have multiple entailed values. For each computed cell whose number of entailed values exceeds a predetermined number of allowed values for the computed cell, a subset of the entailed values is selected, where the size of the subset is no more than the number of allowed values. Some of the entailed values and some of the user-specified values are displayed. (Although all cells and their values may be displayed, it is not necessary to display all cells and all values at once.)

Preferably, the cells are named cells, and may have structured names. The cells may also be able to contain multiple values. The logical constraints are preferably formulated as relational constraints expressed in a logical language encompassing first-order logic. The non-explosive logical consequences may be found by computing logical consequences of multiple consistent subsets of the user-specified values to produce multiple subsets of the complete set of entailed values, and combining the multiple subsets of the complete set of entailed values, e.g., by taking the union of the multiple subsets of the complete set of entailed values. If one of multiple entailed values for a cell matches an existing value contained in the cell, a subset of the entailed values for the cell may be taken by eliminating all but a single entailed value. If the cell was just explicitly emptied by the user, the entailed values for the cell may be replaced by the empty set, eliminating all the entailed values for that cell.

The dynamic partitioning of the set of cells into base cells and computed cells may include one or more of the following: classifying a cell as a base cell when a user-specified value is explicitly assigned to the cell, unclassifying a cell as a base cell when the cell contains a value individually inconsistent with a user-specified value explicitly assigned to another cell, unclassifying a cell as a base cell when the cell entails a value in another cell and the value is explicitly changed or removed.

In one embodiment, the appearance of cells containing inconsistent values may be altered when they are displayed. The alteration may include, for example, dynamically changing the appearance of a subset of cells containing related inconsistent values when a user pointer hovers over the subset of cells. The displaying may also include providing a menu associated with a cell, where the menu contains a list of possible values. Preferably, the possible values are classified, e.g., by labeling them as either being non-explosively entailed, being non-explosively contradicted, or neither.

An interactive user interface may be provided for an electronic document such as a spreadsheet document, an HTML document, a word processing document, and a PDF document, in order to display the values and receive input from a user. Responsive to a user instruction, values may be specified for cells, or existing values in cells may be cleared. In addition, in response to a user instruction, values may be automatically assigned to empty cells such that the automatically assigned values are consistent with the logical constraints. A user may also give an instruction to execute an automatic altering values of cells to reduce conflicts with the logical constraints.

In brief, the present invention provides spreadsheet systems which allow for general logical constraints and omni-directional propagation. These spreadsheets provide greater benefits than traditional spreadsheets while preserving the key features of automatic calculation of values and ease of administration. They have applications in data management, design, and configuration.

BRIEF DESCRIPTION OF THE DRAWINGS

FIG. 5 is a diagram illustrating a set of core instructions that are used in a spreadsheet.

FIG. 6 is a schematic diagram of a logical spreadsheet having three cells dynamically partitioned between base cells and computed cells according to an embodiment of the invention.

FIGS. 7A and 7B show two tables as they might be displayed to a user in a spreadsheet created using a spreadsheet system according to an embodiment of the invention.

FIG. 8 is a flowchart outlining steps performed by a spreadsheet system according to an embodiment of the invention.

FIGS. 9A-D are schematic diagrams of four tables of an exemplary spreadsheet in an early stage of modification by a user in accordance with an embodiment of the invention.

FIGS. 10A-D show the tables of the exemplary spreadsheet of FIGS. 9A-D in an intermediate stage of modification by a user.

FIGS. 11A-D show the tables of the exemplary spreadsheet of FIGS. 10A-D in a later stage of modification by a user.

FIGS. 12A-D show the tables of the exemplary spreadsheet of FIGS. 11A-D in a still later stage of modification by a user.

DETAILED DESCRIPTION

Figure 2:
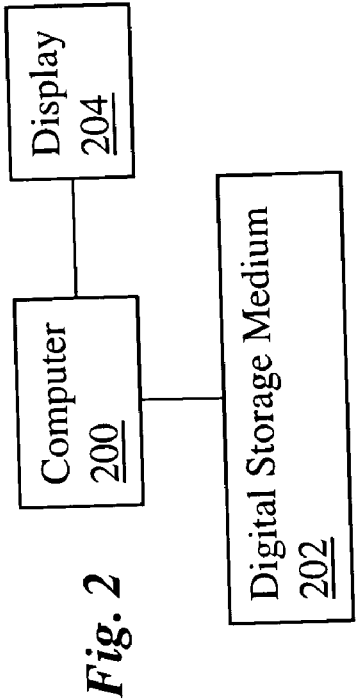
FIG. 2 is a schematic diagram of a computer system which may be used to implement a spreadsheet system according to an embodiment of the invention.

A key feature of the logical spreadsheets of the present invention is that they allow for inconsistency between the value assignments and the constraints. This approach differs from the traditional consistency-maintaining techniques. In addition to allowing for inconsistencies, these spreadsheets actually show the consequences of the value assignments, even when the assignments are inconsistent with the constraints. Consequences under inconsistency are computed using a non-explosive consequence relation. As with traditional electronic spreadsheets, the spreadsheets of the present invention may be implemented on a single computer 200 having a digital storage medium 202 and display 204, as shown in FIG. 2. Alternatively, the spreadsheet may be implemented in a distributed computing environment, in separate computers over a computer network, or in various other hardware and network architectures and computing environments. Those skilled in the art will appreciate that many such implementations and realizations are possible and that the invention is not in principle limited to any specific one.

Definitions

Figure 3:
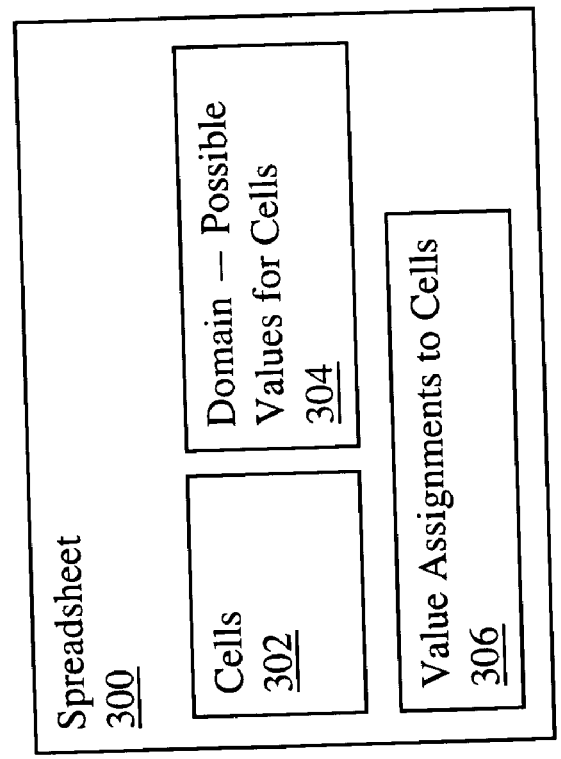
FIG. 3 is a diagram illustrating the data structures contained within a spreadsheet.

The following definitions will be used for terms used in this description. In its most abstract sense, a spreadsheet 300 can be defined as a collection of n cells 302 together with a set of possible values for these cells 304, as shown in FIG. 3. The set of possible values for the cells is called the spreadsheet's domain. Cells can be associated with values in the domain. We represent these associations with sets of ground atomic sentences with a unary relation constant. The individual unary ground atomic sentences are called value assignments. A spreadsheet also includes a set of value assignments to the cells 306. A value map is a set of value assignments in which each cell is assigned at most one value. For example, {p(a), q(b)} means that cell p has value a and cell q has value b. A value map is complete if and only if it provides a value for every cell; otherwise, it is partial. An update request is a value map together with a set of cells to be emptied.

Figure 4:
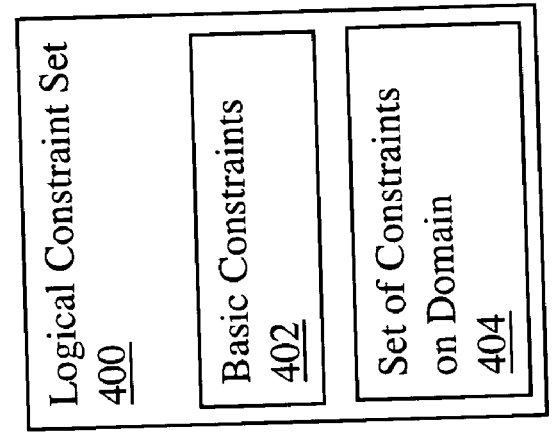
FIG. 4 is a diagram illustrating a set of logical constraints that are used in a logical spreadsheet according to an embodiment of the invention.

A logical spreadsheet is a spreadsheet together with a set of logical constraints 400, as shown in FIG. 4. The vocabulary of the constraint language for logical spreadsheets consists of a finite set of unary relation constants, which serve as names for the cells of our spreadsheet, a set of interpreted n-ary relation constants including algebraic operators, along with a set of object constants, representing objects in the domains of the cells. Logical sentences are built up in the usual way from this vocabulary and the binary relation symbol = (equality), using the logical connectives ¬(negation), ∧(conjunction), ∨(disjunction), ⇒(implication) and ⇔(equivalence) and the quantifiers ∀ (universal quantification) and ∃ (existential quantification). We use a standard model theory and proof theory. The constraints 400 typically include basic constraints 402 that are common to most spreadsheet documents in the spreadsheet system and domain constraints 404 that are customized by the user for each spreadsheet document.

Because spreadsheets are invariably realized on electronic computers as electronic spreadsheets, the term spreadsheet is often used interchangeably with electronic spreadsheet, and may also be used to include other associated features. For example, a spreadsheet typically has a set of core instructions 500 including instructions for a user interface 502 and a computation engine 504 for updating calculated cells, as shown in FIG. 5. The update computation engine contains update semantics that specify the manner in which the values of cells automatically change after a user explicitly makes a modification to a cell. Update semantics include, for example, one or more notions of consequence that are used to compute the values in computed cells from user-specified values in base cells and the logical constraints. Spreadsheets of the present invention use a non-explosive or paraconsistent consequence relation. In preferred embodiments, the non-explosive consequence relation is called existential Ω-entailment. A set of value assignments Λ existentially Ω-entails a value assignment φ if and only if there is some subset of value assignments $\lambda \subseteq \Lambda$ consistent with a set of constraints Ω such that $\lambda \cup \Omega$ logically entails φ.

Embodiments of the present invention will now be described in detail with reference to the drawing figures. It will be appreciated that the following description contains many examples for illustrative purposes only. Accordingly, the full scope of the invention should not be limited by the specific details used below.

ILLUSTRATIVE EXAMPLES

Figure 1:
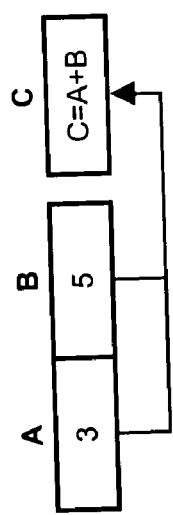
FIG. 1 is a schematic diagram of a traditional spreadsheet having two base cells and one computed cell.

It is instructive to illustrate the innovative features of spreadsheets of the invention by first considering some simple examples of these spreadsheets in action. For example, the three-cell traditional spreadsheet of FIG. 1 may be contrasted with the three-cell logical spreadsheet of FIG. 6. As already discussed above, the traditional spreadsheet has a one-way propagation from user-specified values in cells A and B to a calculated value determined by the function in cell C. That is, one can specify values for A and B and the spreadsheet will automatically calculate C, but one can not specify values for A and C and obtain the value for B. In contrast, the logical spreadsheet of FIG. 6 has three cells and a separate formula C=A+B that acts as a constraint on the values of the three cells that allows propagation of values to take place in any direction. For example, if a user enters values in cells B and C, then a value for cell A is computed as a consequence. Or, if a user enters values in cells A and C, then a value for cell B is computed. This example not only illustrates the omni-directional propagation, but also shows how cells dynamically change between computed cells and base cells. This increased flexibility introduces the possibility that the user may enter values in all three cells that are inconsistent with the constraints on those cells. For example, a user may enter 1 in cell A, 1 in cell B, and 3 in cell C. Since 1+1≠3, these user-specified values are inconsistent with the relation A+B=C. Accordingly, logical spreadsheets of the present invention include various innovative techniques to handle the complexities that arise from this increase in flexibility, as will be described in more detail below.

Laying Out Cells and Tables

In a preferred embodiment, a user creating a new logical spreadsheet document is presented with a blank canvas, a textual constraint editor, and a domain editor. The user begins by placing cells and textual labels on the canvas. The user may also place static text onto the canvas, change the color scheme, etc. A cell may have any number of modalities, such as a drop-down list or a type-in field. In addition, cells may be arranged into tables, complete with row and column names. This arrangement of cells into tables serves not only to visually organize cells, but also allows cells to be given names based on their rows and columns. For example, FIGS. 7A and 7B show two tables as they might be displayed to a user in a spreadsheet created to implement a simple room management system. The Event table in FIG. 7A has three rows (E1, E2, E3), representing events which need to be scheduled, and four columns (Owner, Projection, Room, Time), containing some properties of the events, namely their owner, whether a projector is required, their room, and their time. The Schedule table shown in FIG. 7B represents the schedule for the rooms, where each cell contains the event scheduled in a given room at a given time. It has three rows (Morning, Afternoon, Evening) representing the available times and three columns (G100, G200, G300), representing the available rooms.

Defining Cell Domains

The user can also create domains for cells using a textual editor and associate each cell with a domain. These domains are used to populate cell drop-down lists. For example, the cells in the table of FIG. 7B take values from a list of events (E1, E2, E3). In FIG. 7A, the cells in the Owner column take values from a list of names (Amy, Bob, Cal), the Projection column takes values from a Yes/No list, the Room column takes values from a list of available rooms (G100, G200, G300), and the Time column takes values from a list of available times (Morning, Afternoon, Evening). In some embodiments, the number and rows and columns as well as the labels for the row and column heads are automatically updated as appropriate when the corresponding domains are redefined. With the row and column labels, the cells acquire structured names. For example, the structured name schedule[morning,g100] refers to the cell in the schedule table in the Morning row and the g100 column. This structured name allows rows and columns to be quantified over. In addition to improving the user experience by reducing the replication typically required in a traditional spreadsheet, structured names allow tables to be queried in a manner similar to database tables. Indeed, since all rows in a table are named, one can either treat a row as a tuple with attributes named by the columns, or treat a column as a tuple with attributes named by the rows.

Formula Language and Constraints

Once the cells and tables are laid out, the user can create constraints that express relationships between cells. The constraints may be written as textual formulas using a variant of first order logic. Formulas can be built up from these structured names and the binary relation symbol = (equality), using the logical connectives ¬(negation), ∧(conjunction), ∨(disjunction), ⇒(implication) and ⇔(equivalence) and the quantifiers ∀ (universal quantification) and ∃ (existential quantification). There are no restrictions on these formulas. For convenience, users may define new n-ary relations using ⇔ and use these in an unrestricted manner. Decidability is preserved since these n-ary relations are reducible to unary ones. For example, Table 1 shows the set of constraints for the room manager spreadsheet shown in FIGS. 7A and 7B. Note that free variables are considered to be universally quantified.

TABLE 1

| No. | Constraint |
| --- | --- |
| 1 | event[E,room](g100) or event[E,room](g200) or event[E,room](g300) |
| 2 | event[E,time](morning) or event[E,time](afternoon) or event[E,time](evening) |
| 3 | schedule[T,R](E) ⇔ event[E,time](T) ∧ event[E,room](R) |
| 4 | event[E,projection](yes) ∧ event[E,room](R) ⇒ room[R,projector](yes) |
| 5 | event[E,owner](P) ∧ person[P,faculty](no) ⇒ ¬event[E,room](g100) |

The constraints 1 and 2 dictate that every event has a room and a time in the room and time domains, respectively. Constraint 3 relates the schedule table in FIG. 7A to the event table in FIG. 7B. Constraint 4 states that if an event requires a projector then it must be scheduled in a room with a projector. Constraint 5 states that only faculty members can reserve room g100.

Updates and Computing Consequences

Once the spreadsheet is set up, the user may proceed to use the newly created spreadsheet. As the user enters and deletes values from cells, the values in other cells may be changed automatically based on the logical constraints which have been defined. An overview of the process is shown in the flowchart of FIG. 8. In step 802 a user makes an explicit change to a cell, e.g., if the cell has a value, either changing the value or clearing the cell; and if the cell is empty, entering a value in the cell. In step 804 the cells are automatically partitioned into base cells and computed cells. The non-explosive consequences of base cells are computed in step 806, producing sets of entailed values for the computed cells. In some cases, the number of entailed values for a cell may be reduced in step 808. Step 810 then displays values of the base cells and computed cells. The above steps will now be described in more detail.

In preferred embodiments, a user interface is provided to allow a user to make changes to the values in cells (step 802). The user interface may include, for example, a display of some or all of the cells, with drop-down or pop-up menus to facilitate data entry. The menus may contain lists of values which may be organized or categorized to further facilitate interactivity with the user. A user can modify a cell in one of three ways: The user can assign a value to a previously empty cell, change a value currently assigned to a cell to another value, or empty a cell that currently has a value.

Once a user-specified change has been made to a cell, the cells are dynamically partitioned into "base cells" and "computed cells" (step 804). In particular, if a cell has been directly modified by the user, the cell is classified automatically as a base cell. In addition, some other cells then lose their status as base cells and are reclassified as computed cells. Specifically, in the case of a new value assignment to a cell, any base cells with values that, together with the constraints, directly contradict the newly assigned value are reclassified as computed cells. In the case of a cell that is emptied of a value, any cells with values that, together with the constraints, directly entail a value in the emptied cell are reclassified as computed cells. In the case where two or more base cells have values that together contradict the newly assigned value but none does individually, these cells are left as is and do not lose their status as base cells. This leads to inconsistency. Similarly, if two or more cells have values that together entail a value in the newly emptied cell but none does individually, these cells are left as is and remain base cells. This leads to the newly empty base cell having an entailed value. Note that since the newly emptied cell is now a base cell, the cell does not contain a computed value and remains empty. This completes the dynamic partitioning of cells.

After the partitioning of base and computed cells, the set of entailed values is calculated (step 806). The entailed values are the non-explosive consequences of the values in the base cells and the specified logical constraints. To calculate the non-explosive consequences, a paraconsistent consequence relation called existential $\Omega$-entailment is preferably used. In other words, the non-explosive logical consequences may be found by 1) identifying subsets of the set of values in the base cells that are consistent with the logical constraints, using for example the resolution proof technique to determine consistency, 2) computing the logical consequences of the identified consistent subsets and the logical constraints to produce corresponding sets of entailed values for the computed cells, and 3) combining the computed sets of entailed values to form a complete set of entailed values, e.g., by taking their union or intersection. Which particular combination is used will depend on the application, though in the preferred embodiment, the union is taken.

The next step is to fill the computed cells with the existential $\Omega$-consequences of the base values and the constraints. However, the complete set of entailed values does not necessarily provide one unique value for each computed cell, so in some cases the set of entailed values may be subsetted (step 808). If a computed cell is allowed to contain just one value, but more than one entailed value is computed for the cell, then the number of entailed values may be reduced to one using inertia as a tie-breaker: if the cell contained a value before the update and the value is still existentially $\Omega$-entailed, then that value remains in the cell. If there are multiple existentially $\Omega$-entailed values for a computed cell but none of these was in the cell before the update, the cell is left empty. Similarly, if a cell can contain multiple values, but the number of entailed values exceeds the number of allowed values, then the number of entailed values may be reduced to the required number using inertia as a tie-breaker: if the cell contained a value before the update and that value is still existentially $\Omega$-entailed, then that value remains in the cell. Again, if there are more than the maximum allowed existentially $\Omega$-entailed values for a computed cell but none of these was in the cell before the update, the cell is left empty.

Finally, the values are displayed to the user via a user interface (step 810). Some or all of the values for the base cells and computed cells may be displayed, depending on the particular layout in current use. In the case of a layout that contains all tables and cells, all the values might be displayed. Other layouts may display a subset of the base cells and computed cells, in which case a subset of the values is displayed. Spreadsheet systems of the present invention may be implemented with many different user interfaces. In a preferred embodiment, the user interface implements features such as drop-down menus to select values from domains and shaded cells to indicate inconsistent values. Shading, coloring, and various other types of markings or highlighting of cells can also be used to show which cells are base cells, computed cells, never-modified cells, recently modified cells, and newly modified cells. In addition, a mouse-over (i.e., placing a user-controllable pointer over a cell) can result in a highlight of a group of cells that are related (e.g., cells that are in conflict with a common constraint, or cells that are related by a common constraint). A group of cells in conflict with a particular constraint can be determined using standard database techniques to query for values that do not satisfy the constraint.

Update Illustration

The technique described above for updating cells will now be illustrated using the room management system discussed earlier in relation to FIGS. 7A and 7B. The room manager consists of four tables, named event, schedule, room, and person, shown schematically in FIGS. 9A-D, respectively. The event table contains event requests, each of which has an owner, a specification of whether a projector is needed, a room, and a time. The schedule table contains a schedule of the events. The information is redundant with the first table but is useful because it offers a different view. The room table lists whether or not each room has a projector. The person table lists whether each person is a faculty member or not. The values in the person and room tables are entered by the user before scheduling specific events.

An administrator using the spreadsheet has the task of assigning to three new events a room and a time. The user begins by specifying values for cells in the owner and projection columns of the event table, as shown in FIG. 9A. These values specify, for each event, the event owner's name and whether a projector is needed.

After entering a value in a cell, the spreadsheet system responds by automatically updating the spreadsheet. First, the system determines which cells are base cells and which are computed cells. As shown in the figures, base cells are marked with a triangle in the upper left-hand corner of the cell, while computed cells are not. These are the cells in which the user has explicitly specified values. The system then automatically computes the non-explosive consequences of the base cells. In this example, the system automatically computes the and displays a value g100 for the room of event e3 in the event table. This value is entailed by the logical constraints since the user specified that e3 requires a projector, and g100 is the only room with a projector.

As shown in FIGS. 10A-D, the user then specifies additional properties for event e1 in the event table. In particular, the user selects g100 as the room for event e1 and morning as its time. The system responds by classifying these cells as base cells and displaying them with a triangle, as shown in FIG. 10A. The system also responds by automatically calculating entailed values. Specifically, the user's specification of a room and time for event e1 in the event table causes e1 to show up in the corresponding cell in the schedule table, as shown in FIG. 10B. The user then directly modifies a cell in the schedule table by assigning the value e2 to room g200 in the afternoon. The system responds by automatically calculating the entailed values and displaying them in row e2 of the event table, as shown in FIG. 10A. This example illustrates the spreadsheet's ability to propagate values in multiple directions. That is, user modifications of values for cells in the event table result in entailed values appearing in cells of the schedule table, and vice versa.

Next, as shown in FIGS. 11A-D, the user moves e1 from morning to evening by clearing the g100 morning cell and entering e1 in the g100 evening cell of the schedule table. The spreadsheet system responds by reclassifying the e1 time cell of the event table from a base cell to a computed cell. It also computes and displays the entailed value evening for that cell, over-riding the previously specified morning value for the cell. This illustrates how the automatic update of the spreadsheet deals with a direct conflict between a value previously specified for a cell and a new entailed value for the cell that is a consequence of a newly specified value in another cell.

As illustrated in FIGS. 11A-D, the user then changes the room assignment for e3 from g100 to g200 by modifying the appropriate cell in the event table. The system responds by reclassifying the cell from a computed cell to a base cell. The system also responds by computing the entailed values. However, since e3 requires a projector and g200 lacks a projector, these user-specified values are inconsistent with the logical constraints. Nevertheless, the system allows the conflicting values to be entered. Since the inconsistency is caused by multiple cells, the system responds by coloring or shading the conflicting cells. Specifically, a cell is colored if it contains a value that is non-explosively contradicted by the values in the other cells. Note that if the conflict had been caused by a value in just one cell, the system would have modified the existing value in the cell to eliminate the conflict, as shown in the previous example. This example shows how the spreadsheet system deals with conflicts caused by values in multiple cells.

The user does not have to resolve the conflict immediately. For example, as shown in FIGS. 12A-D, the user may instead proceed to set the time of event e3 to the morning by modifying the appropriate cell of the event table. The modified cell is automatically marked as a base cell and event e3 appears automatically in the appropriate cell of the schedule table. Thus, even though the specified values in the base cells remain inconsistent with the constraints, the system is still able to compute entailed values using existential $\Omega$-entailment and display the consequences of the (inconsistent) base assignments. The administrator can remove the inconsistency and complete the event scheduling by moving the projector from g100 into g200 (not shown).

Variations

Although the example spreadsheet illustrated above shows many of the features enjoyed by most implementations of logical spreadsheets, there are some variations that are worthy of explicit mention. The domains for cells may include various types of numbers and logical values in addition to alphanumeric strings. Cells are not necessarily limited to containing just one value, but could contain multiple values (e.g., someone's three children). Cells could also store vectors, arrays, matrices, tables, or other structured values. In addition to constraints on the values of cells, logical constraints may also embody constraints on changes in the values of the cells. It should also be emphasized that the particular techniques for updating cells illustrated in the example above is just one specific approach. There are other reasonable interpretations of what it means to be a consequence of an inconsistent spreadsheet, and such alternate interpretations may be preferred in specific application areas. Moreover, alternate embodiments may include user-selectable preferences that control the automatic update behavior.

Spreadsheet systems of the present invention may also include other additional features such as an auto-complete feature and a deconfliction feature. In response to a user instruction to auto-complete a spreadsheet, the system will fill in empty spreadsheet cells with consistent values. The user can then alter or adjust the values to further customize the solution. If deconfliction is activated, the system will change existing values that are inconsistent to reduce or preferably eliminate inconsistencies. The user can then adjust the values of cells to arrive at a suitable solution. Auto-completion can be implemented, for example, by querying for empty cell values that satisfy the constraints given the current cell values, using standard database query techniques. Similarly, an implementation of deconfliction can query for conflicted cell values that satisfy the constraints given the non-conflicting cell values.

Applications

It will be evident to those skilled in the art that the spreadsheet systems of the present invention have many applications and uses. Here we mention just a few of the many possible types applications. First, logical spreadsheets have applications to data management. Logical spreadsheets facilitate the entry and editing of symbolic data governed by symbolic constraints. "Correct on capture" data entry systems and resource management systems, like the one illustrated in this description, are examples of this capability. Logical spreadsheets could also be used as a "data browser" for the Semantic Web. A Web-aware logical spreadsheet could be used to integrate data from different sources and the translate data from one schema to another. Logical spreadsheets also are useful in design applications. Configuration systems are good examples of the use of logical spreadsheets in design. Consider, for example, a configuration system to help users design their own cars or computer systems. Another application of logical spreadsheets is implementing smart forms. A spreadsheet with an HTML front end would allow users to fill out online forms in which data is checked for semantic well-formedness. Interactive documents are another application of logical spreadsheets. Systems can return "interactive answers" to users, e.g. simulations, which allow a user to experiment by varying certain parameters while the system automatically propagates the consequences of those variations. Consider, for example, a student learning how lenses refract light by experimenting with different lens shapes. Spreadsheets could also support collaborative applications if they were linked, with automatic propagation of values and constraints among the connected spreadsheets. Linked spreadsheets of this sort would support a wide variety of applications in cooperative design and collaborative management. In addition, linking would allow the creation of a World Wide Spreadsheet.

The invention claimed is:

1. A method for displaying consequences in an electronic spreadsheet, the method comprising:
    specifying a set of cells of the spreadsheet and a set of logical constraints on possible values of the cells;
    dynamically partitioning the set of cells into base cells and computed cells;
    assigning to the base cells a set of user-specified values, wherein the user-specified values are possibly inconsistent with the specified logical constraints;
    computing non-explosive logical consequences of the user-specified values and the set of logical constraints using a paraconsistent consequence relation to produce a complete set of entailed values for the set of computed cells;
    reducing the number of entailed values for each computed cell whose number of entailed values exceeds a predetermined number of allowed values for the computed cell; and
    displaying a subset of the entailed values and a subset of the user-specified values;
    wherein computing the non-explosive logical consequences comprises computing logical consequences of multiple consistent subsets of the user-specified values to produce multiple subsets of the complete set of entailed values, and combining the multiple subsets of the complete set of entailed values.

2. The method of claim 1 wherein the cells are named cells.

3. The method of claim 2 wherein the named cells have structured names.

4. The method of claim 1 wherein the cells are able to contain multiple values.

5. The method of claim 1 wherein the combining is done by taking the union of the multiple subsets of the complete set of entailed values.

6. The method of claim 1 wherein dynamically partitioning the set of cells into base cells and computed cells comprises classifying a cell as a base cell when a user-specified value is explicitly assigned to the cell.

7. The method of claim 1 wherein dynamically partitioning the set of cells into base cells and computed cells comprises unclassifying a cell as a base cell when the cell contains a value individually inconsistent with a user-specified value explicitly assigned to another cell.

8. The method of claim 1 wherein dynamically partitioning the set of cells into base cells and computed cells comprises unclassifying a cell as a base cell when the cell entails a value in another cell and the value is explicitly changed or removed.

9. The method of claim 1 wherein the logical constraints are formulated as relational constraints expressed in a logical language encompassing first-order logic.

10. The method of claim 1 wherein the displaying comprises altering an appearance of cells containing inconsistent values.

11. The method of claim 10 wherein the altering the appearance of cells containing inconsistent values comprises dynamically changing the appearance of a subset of cells containing related inconsistent values when a user pointer hovers over the subset of cells.

12. The method of claim 1 wherein the displaying comprises providing a menu associated with a cell, wherein the menu comprises a list of possible values classified as being non-explosively entailed, being non-explosively contradicted, or neither.

13. The method of claim 1 wherein the displaying comprises providing an interactive user interface for an electronic document.

14. The method of claim 13 wherein the electronic document is selected from the group consisting of a spreadsheet document, an HTML document, a word processing document, and a PDF document.

15. The method of claim 1 further comprising, responsive to a user instruction, automatically assigning values to empty cells such that the automatically assigned values are consistent with the logical constraints.

16. The method of claim 1 further comprising, responsive to a user instruction, automatically altering values of cells to reduce conflicts with the logical constraints.

17. The method of claim 1 wherein reducing the number of entailed values comprises eliminating all but a single entailed value if the single entailed value matches an existing value contained in the cell.

* * * * *